United States Patent [19]

Drent et al.

[11] Patent Number: 5,091,506
[45] Date of Patent: Feb. 25, 1992

[54] POLYMERIZATION OF CARBON MONOXIDE/NORBORNENE WITH P BIDENTATE LIGAND

[75] Inventors: Eit Drent; Anthonius J. M. Breed, both of Amsterdam, Netherlands

[73] Assignee: Shell Oil Compnay, Houston, Tex.

[21] Appl. No.: 585,750

[22] Filed: Sep. 17, 1990

[30] Foreign Application Priority Data

Oct. 11, 1989 [NL] Netherlands ............... 8902518

[51] Int. Cl.$^5$ .................................... C08G 67/02
[52] U.S. Cl. ................................. 528/392; 525/539
[58] Field of Search .................... 528/392; 525/539

[56] References Cited

U.S. PATENT DOCUMENTS

| | | | |
|---|---|---|---|
| 3,835,123 | 9/1972 | Nozaki | 260/94.9 B |
| 4,788,279 | 11/1988 | Drent | 528/392 |
| 4,818,810 | 4/1989 | Drent | 528/392 |
| 4,835,250 | 5/1989 | Drent | 528/392 |
| 4,843,144 | 6/1989 | Van Broekhoven et al. | 528/392 |
| 4,868,282 | 9/1989 | Van Broekhoven et al. | 528/392 |
| 4,880,903 | 11/1989 | Van Broekhoven et al. | 528/392 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 257663 | 3/1988 | European Pat. Off. . |

*Primary Examiner*—Harold D. Anderson

[57] ABSTRACT

An improved process for the production of linear alternating polymers of carbon monoxide and hydrocarbon norbornene-type compounds comprises contacting the monomers in the presence of a catalytic quantity of a catalyst composition formed from a palladium compound, the anion of a strong non-hydrohalogenic acid and a bidentate ligand of phosphorus under polymerization conditions including a polymerization temperature above 100° C. In an alternate modification, lower α-olefin is included in the reaction mixture and additional polymeric products are obtained.

10 Claims, No Drawings

POLYMERIZATION OF CARBON MONOXIDE/NORBORNENE WITH P BIDENTATE LIGAND

FIELD OF THE INVENTION

This invention relates to an improved process for the production of linear alternating polymers of carbon monoxide and certain cyclic ethylenically unsaturated hydrocarbons. More particularly, the invention relates to an improved process of producing linear alternating copolymers of carbon monoxide and certain norbornene-type compounds.

BACKGROUND OF THE INVENTION

The class of linear alternating polymers of carbon monoxide and one or more ethylenically unsaturated hydrocarbons is known in the art. An early production of such polymers is described by Nozaki, e.g., U.S. Pat. No. 3,964,412, who employed catalyst compositions comprising monodentate phosphorus complexes of palladium moieties and certain inert solvents. More recent production of such polymers is disclosed by a number of published European Patent Applications including 121,965, 181,014, 213,671 and 257,663. The process of such published applications, in preferred embodiments, typically involves a catalyst composition formed from a compound of palladium, an anion of a strong non-hydrohalogenic acid and a bidentate ligand of phosphorus or nitrogen. The resulting polymers are relatively high molecular weight materials having utility as thermoplastic polymers. The linear alternating polymers, now known as polyketones or polyketone polymers, are processed by methods conventional for thermoplastics such as extrusion, injection molding or thermoforming into shaped articles having a variety of applications including the production of containers for food and drink.

When the ethylenically unsaturated hydrocarbon to be employed in the production of linear alternating polymers is cyclic and complex, certain special considerations arise during the polymerization process. Linear alternating copolymers of carbon monoxide and a hydrocarbon norbornene-type compound are produced in the presence of a catalyst composition produced from a palladium compound, the anion of a strong non-hydrohalogenic acid and a bidentate ligand of nitrogen, as shown in U.S. Pat. No. 4,788,279. These polymers are also produced in the presence of a HPd(CN)₃ catalyst complex as disclosed in U.S. Pat. No. 3,835,123. However, when the more recent and generally preferred catalyst compositions based in part on a bidentate ligand of phosphorus are employed, the linear alternating polymers of carbon monoxide and hydrocarbon norbornene-type compound are not observed at the typical reaction conditions including a reaction temperature below 100° C. It would be of advantage to provide a process for the production of such copolymers in the presence of the more preferred catalyst complexes formed from, inter alia, a bidentate ligand of phosphorus.

SUMMARY OF THE INVENTION

The present invention provides an improved process of producing linear alternating copolymers of carbon monoxide and hydrocarbon norbornene-type compound. More particularly, the present invention relates to an improved process for the production of such copolymers by contacting the monomers in the presence of a catalyst composition based on a bidentate ligand of phosphorus at a polymerization temperature above 100° C. The reaction mixture optionally contains a straight chain lower α-olefin of up to 4 carbon atoms inclusive.

DESCRIPTION OF THE INVENTION

The process of the invention produces linear alternating copolymers of carbon monoxide and a hydrocarbon norbornene-type compound by contacting the carbon monoxide, the norbornene-type compound and optionally α-olefin of up to 4 carbon atoms inclusive in the presence of a catalyst composition formed from a compound of palladium, the anion of a strong non-hydrohalogenic acid and a bidentate ligand of phosphorus under polymerization conditions which include a polymerization temperature over 100° C. The resulting polymer product contains the desired linear alternating copolymer. In the optional presence of the α-olefin, linear alternating copolymer of carbon monoxide and the α-olefin is also present as is a block copolymer containing a block of the linear alternating copolymer of carbon monoxide and the norbornene-type compound and a block of a linear alternating copolymer of carbon monoxide and the α-olefin.

The hydrocarbon norbornene compound is a cyclic hydrocarbon compound having a ring of 6 carbon atoms in which the 1 and 4 carbon atoms are connected by a substituted or unsubstituted methylene group and the 5 and 6 carbon atoms are connected by an ethylenic carbon-carbon double bond. At least one of the 2 and 3 carbon atoms contains a hydrocarbon substituent and when both the 2 and 3 positions are so substituted the substituents taken together may form a divalent connecting group. Illustrative of such hydrocarbon norbornene-type compounds are the compounds of the formula

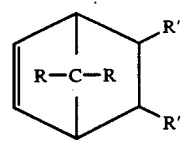

(I)

where R independently is hydrogen or lower alkyl of up to 4 carbon atoms inclusive, preferably hydrogen, and R' is R or such that the two R' groups form a divalent bridging group of up to 10 carbon atoms with from 2 to 4 carbon atoms in the bridge. Examples of such norbornene-type compounds include 5-norbornene, 2-methyl-5-norbornene, 2,3-dimethyl-5-norbornene, 2-butyl-7-methyl-5-norbornene, 2,3-(propylene)-5-norbornene and dicyclopentadiene. In the polymerization process of the invention, the total molar ratio of the hydrocarbon norbornene-type compound and any optional α-olefin to carbon monoxide is from about 10:1 to about 1:10 but preferably from about 5:1 to about 1:5.

In the optional modification of the process of the invention, a lower α-olefin of up to 4 carbon atoms inclusive is additionally present in the polymerization mixture. Straight-chain lower α-olefins are preferred, i.e., ethylene, propylene and 1-butene, but the α-olefin when present is preferably ethylene. The presence of the lower α-olefin provides the advantage of a generally more rapid polymerization rate. This presence also changes the composition of the reaction mixture in that, in addition to the linear alternating copolymer of carbon monoxide and the hydrocarbon norbornene-type compound, the polymer product additionally contains linear alternating copolymer of carbon monoxide and the α-olefin and block copolymer containing a block of linear alternating copolymer of carbon monoxide and norbornene-type compound and a block of linear alternating copolymer of carbon monoxide and the α-olefin. When α-olefin is present in the polymerization mixture, the α-olefin is present in a quantity of up to 1 mol per mol of norbornene-type compound. No α-olefin need be present, of course, but when present the α-olefin is preferably present in a quantity of from about 0.1 mol to about 1 mol per mol of norbornene-type compound.

The polymerization process is conducted in the presence of a catalyst composition formed from a compound of palladium, an anion of a non-hydrohalogenic acid having a pKa (measured in water at 18° C.) below 2 and a bidentate ligand of phosphorus. The palladium compound is suitably a palladium alkanoate and alkanoates such as palladium acetate, palladium propionate and palladium hexanoate ar satisfactory. The preferred palladium compound is palladium acetate. The anion of the non-hydrohalogenic acid employed in formation of the catalyst composition is the anion of an inorganic acid such as sulfuric acid or perchloric acid or is the anion of an organic acid such as a carboxylic acid, e.g., trichloroacetic acid, difluoroacetic acid or trifluoroacetic acid, or a sulfonic acid, e.g., p-toluenesulfonic acid, methanesulfonic acid or trifluoromethanesulfonic acid. Anions of organic carboxylic acids are generally preferred and particularly preferred is the anion of trifluoroacetic acid. The anion is preferably provided as the free acid but alternatively is provided as a metal salt, particularly as a non-noble transition metal salt such as copper salt. In yet another modification, the anion is provided as the salt of the palladium component of the catalyst composition, e.g., palladium trifluoroacetate. By whatever method provided, the anion is present during catalyst composition production in a quantity of from about 1 mol to about 1000 mols per mol of palladium. Preferred quantities of anion are from about 2 mols to about 100 mols of anion per mol of palladium.

The bidentate phosphorus ligand is suitably a ligand of the formula

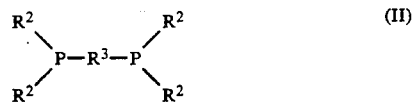

(II)

wherein $R^2$ independently is aryl of up to 10 carbon atoms inclusive and $R^3$ is a divalent bridging group of up to 10 carbon atoms inclusive with from 2 to 3 carbon atoms in the bridge. The term $R^2$ is independently hydrocarbon containing only atoms of carbon and hydrogen or is substituted-hydrocarbon containing additional atoms such as divalent oxygen in the form of aromatic ring substituents which are preferably polar and at least one of which is located on a ring carbon atom ortho to the atom through which the aromatic ring is connected to the phosphorus. Illustrative $R^2$ groups include phenyl, o-methoxyphenyl, 2,4-dimethoxyphenyl, 2,6-diethoxyphenyl and 4-propoxy-2,6-dimethoxyphenyl. The $R^2$ groups are preferably the same and particularly preferred as each $R^2$ group is phenyl or o-methoxyphenyl. The $R^3$ group is preferably hydrocarbon and is illustrated by 1,2-ethylene, 1,3-propylene and 2,2-dimethyl-1,3-propylene. The preferred bidentate phosphorus ligand is 1,3-(diphenylphosphino)propane or 1,3-bis[di(2-methoxyphenyl)phosphino]propane. The quantity of the bidentate ligand to be employed is typically from about 0.5 mol to about 10 mols per mol of palladium compound. Quantities of bidentate phosphorus ligand from about 0.75 mol to about 5 mols per mol of palladium are preferred.

In order to enhance the activity of the catalyst composition, it is useful on some occasions to provide to the catalyst composition mixture an organic oxidant. Oxidants such as 1,4-quinones, e.g., 1,4-benzoquinone and 1,4-naphthoquinone are useful for this purpose. Preferred as the organic oxidant is 1,4-benzoquinone. As stated, no quinone need be present but amounts of 1,4-quinone up to about 10,000 mols per mol of palladium are satisfactory. When quinone is present, quantities of quinone from about 10 mols to about 5000 mols per mol of palladium are preferred.

The polymerization is conducted in the presence of a catalytic quantity of the catalyst composition under polymerization conditions in the presence of a reaction diluent. A sufficient quantity of catalyst is utilized to provide from about $1 \times 10^{-7}$ mol to about $1 \times 10^{-3}$ mol of palladium per mol of total unsaturated hydrocarbon. Quantities of catalyst composition sufficient to provide from about $1 \times 10^{-6}$ mol to about $1 \times 10^{-4}$ mol of palladium per mol of total unsaturated hydrocarbon are preferred. The reaction diluent is usefully an alkanol such as methanol or ethanol. Methanol is preferred. The polymerization conditions include a polymerization temperature above 100° C. since lower reaction temperatures do not give significant quantities of the desired copolymeric product. Reaction temperatures from about 100° C. to about 200° C. are satisfactory with preferred polymerization temperatures being from about 110° C. to about 150° C. The reaction pressure is generally from about 5 bar to about 150 bar although pressures from 10 bar to about 100 bar are more often employed.

The polymerization takes place by contacting the monomeric reactants, catalyst composition and reaction diluent in a suitable reactor. The contacting is facilitated by conventional methods such as shaking or stirring. Subsequent to polymerization the reaction is typically terminated as by cooling the reactor and contents and releasing the pressure. The polymeric product is obtained as a material substantially insoluble in the reaction diluent and is recovered by well known methods such as filtration or decantation. The polymeric product is used as recovered or is purified as by contact with solvents or complexing agents which are selective for catalyst residues.

The polymeric product, in the embodiment where the optional α-olefin was not provided to the reaction mixture, is a linear alternating copolymer of carbon monoxide and the hydrocarbon norbornene-type compound. When α-olefin is additionally provided to the reaction mixture the product will contain proportions of linear alternating copolymer of carbon monoxide and the α-olefin as well as a block copolymer having a block of linear alternating carbon monoxide/norbornene-type compound copolymer and a block of linear alternating carbon monoxide/α-olefin copolymer. These polymeric products are utilized as the mixture produced or are separated as by selective extraction or chromatographic techniques. The polymeric product whether used as a mixture or separated is useful as a thermoplastic polymer, being processed by known methods into shaped articles of established utility. Specific applications include the production of containers for food and drink and parts and housings for automotive applications.

The invention is further illustrated by the following Comparative Examples (not of the invention) and the following Illustrative Embodiments which should not be regarded as limiting. In the case of each copolymer produced, the copolymer was examined by $^{13}$C-NMR analysis and found to be linear with alternating units derived from carbon monoxide and units derived from the norbornene-type monomer.

ILLUSTRATIVE-EMBODIMENT I

A copolymer of carbon monoxide and 5-norbornene was prepared by introducing to an autoclave of 250 ml capacity equipped with a mechanical stirrer a catalyst composition solution comprising 50 ml methanol, 0.1 mmol palladium acetate, 2 mmol trifluoroacetic acid and 0.15 mmol 1,3-(diphenylhosphino)propane. After 10 ml of 5-norbornene was introduced into the autoclave, the air present was removed by evacuation. Ethylene was then pressured into the autoclave until a pressure of 20 bar was reached and carbon monoxide was added until a total pressure of 50 bar had been reached. The autoclave and contents were then heated to 110° C. and maintained at that temperature for 5 hours. The polymerization was then terminated by cooling the autoclave to room temperature and releasing the pressure. The yield of copolymer, recovered by filtration of the product mixture, was 9 g.

COMPARATIVE EXAMPLE I

The procedure of Illustrative Embodiment I was substantially repeated except that the reaction time was 1 hour instead of 5 hours and the reaction temperature was 80° C. instead of 110° C. Only a trace of polymer was obtained.

COMPARATIVE EXAMPLE II

The procedure of Illustrative Embodiment I was substantially repeated except that the reaction time was 1 hour instead of 5 hours and the reaction temperature was 90° C. instead of 110° C. Only a trace of polymer was obtained.

ILLUSTRATIVE EMBODIMENT II

A copolymer of carbon monoxide and 5-norbornene was produced by a procedure substantially identical to that of Illustrative Embodiment except that the reaction temperature was 120° C. instead of 110° C. and the reaction time was 3 hours instead of 5 hours. The yield of copolymer was 10.5 g.

ILLUSTRATIVE EMBODIMENT III

A copolymer of carbon monoxide and 5-norbornene was produced by a procedure substantially identical to that of Illustrative Embodiment 1 except that the carbon monoxide was provided to the autoclave until a pressure of 30 bar was reached and no ethylene was provided. The reaction temperature was 120° C. instead of 110° C. and the yield of copolymer was 9.5 g.

ILLUSTRATIVE EMBODIMENT IV

The procedure of Illustrative Embodiment 1 was substantially repeated except that the reaction temperature was 120° C. instead of 110° C. A yield of 22 g of polymeric material was obtained. The polymeric product was extracted with chloroform and the chloroform solution and residue thereby obtained were examined by $^{13}$C-NMR analysis. The residue was a linear alternating carbon monoxide/ethylene copolymer and the solution contained 13 g of a mixture of a linear alternating carbon monoxide/5-norbornene copolymer and a block copolymer containing a block of linear alternating carbon monoxide/5-norbornene copolymer and a block of linear alternating carbon monoxide/ethylene copolymer. In this polymer mixture the ethylene units were 5% of the total units originating from ethylene and 5-norbornene.

ILLUSTRATIVE EMBODIMENT V

The procedure of Illustrative Embodiment 1 was used to produce a copolymer of carbon monoxide and dicyclopentadiene. The procedure was substantially identical except that 10 ml of dicyclopentadiene was introduced into the autoclave instead of 5-norbornene and the reaction temperature was 120° C. instead of 110° C. A yield of 10 g of copolymer was obtained.

ILLUSTRATIVE EMBODIMENT VI

A copolymer of carbon monoxide and a dicyclopentadiene was produced by a procedure substantially identical to that of Illustrative Embodiment III except that 10 ml of dicyclopentadiene was provided to the autoclave instead of 5-norbornene. The yield of copolymer was 6.5 g.

ILLUSTRATIVE EMBODIMENT VII

The procedure of Illustrative Embodiment V was substantially repeated except that the reaction time was 10 hours instead of 5 hours. A yield of 23 g of polymeric product was obtained. This product was extracted with chloroform and the residue obtained, the major product, was examined by $^{13}$C-NMR analysis and found to be a linear alternating copolymer of carbon monoxide and ethylene. The chloroform solution contained 10 g of a mixture of a linear alternating carbon monoxide/dicyclopentadiene copolymer and a block copolymer having a block of linear alternating carbon monoxide/dicyclopentadiene copolymer and a block of linear alternating carbon monoxide/ethylene copolymer. In the mixture present in the solution, the percentage of units originating from ethylene was found to be 10% of the total units originating from ethylene and dicyclopentadiene.

What is claimed is:

1. In the process of producing a linear alternating copolymer of carbon monoxide and a hydrocarbon norbornene compound by contacting the carbon monoxide and the norbornene compound under polymerization conditions of temperature and pressure in the presence of a reaction diluent and a catalyst composition formed from a palladium compound, the anion of a strong non-hydrohalogenic acid and a bidentate ligand, the improvement wherein the ligand is a bidentate ligand of phosphorus and the polymerization temperature is above 100° C.

2. The process of claim 1 wherein the bidentate ligand of phosphorus is represented by the formula

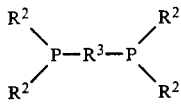

wherein R² independently is aryl of up to 10 carbon atoms inclusive and R³ is a divalent bridging group of up to 10 carbon atoms inclusive with from 2 to 3 carbon atoms in the bridge.

3. The process of claim 2 wherein the polymerization temperature is from about 110° C. to about 150° C.

4. The process of claim 3 wherein the bidentate ligand is 1,3-bis(diphenylphosphino)propane or 1,3bis-propane.

5. In the process of producing a linear alternating copolymer of carbon monoxide and a hydrocarbon norbornene compound of the formula

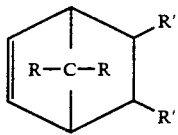

where R independently is hydrogen or lower alkyl and R' independently is R or such that the two R' groups taken together form a divalent linking group, by contacting the carbon monoxide and norbornene compound under polymerization conditions of temperature and pressure in the presence of a catalyst composition formed from a palladium alkanoate, the anion of an organic carboxylic acid having a pKa below 2 and a bidentate ligand, an alkanol reaction diluent and with or without an α-olefin of up to 4 carbon atoms inclusive, the improvement wherein the ligand is a bidentate ligand of phosphorus and the polymerization temperature is from about 100° C. to about 200° C.

6. The process of claim 5 wherein the bidentate ligand of phosphorus is represented by the formula

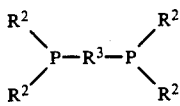

wherein R² is hydrocarbon aryl or substituted hydrocarbon aryl wherein at least one of any substituents is polar and is substituted on a carbon atom ortho to the carbon atom through which the R² group is connected to phosphorus, and R³ is 1,2-ethylene or 1,3-propylene.

7. The process of claim 6 wherein the reaction temperature is from about 110° C. to about 150° C.

8. The process of claim 7 wherein the ligand is 1,3-bis(diphenylphosphino)propane or 1,3-bispropane.

9. The process of claim 8 wherein the ligand is 1,3-bis(diphenylphosphino)propane.

10. The process of claim 8 wherein the ligand is 1,3-bispropane.

* * * * *